(12) United States Patent
Liang et al.

(10) Patent No.: US 10,131,832 B2
(45) Date of Patent: Nov. 20, 2018

(54) SELF-SUSPENDING PROPPANTS FOR USE IN CARBON DIOXIDE-BASED FRACTURING FLUIDS AND METHODS OF MAKING AND USE THEREOF

(71) Applicants: Aramco Services Company, Houston, TX (US); Research Foundation of The City University of New York, New York, NY (US)

(72) Inventors: Feng Liang, Cypress, TX (US); Ghaithan A. Al-Muntasheri, Katy, TX (US); Leiming Li, Sugar Land, TX (US); B. Raghava Reddy, Pearland, TX (US); George John, Edison, NJ (US); Vidyasagar Adiyala, New York, NY (US)

(73) Assignees: Aramco Services Company, Houston, TX (US); Research Foundation of The City University of New York, New York, NY (US)

( * ) Notice: Subject to any disclaimer, the term of this patent is extended or adjusted under 35 U.S.C. 154(b) by 0 days.

(21) Appl. No.: 15/702,310

(22) Filed: Sep. 12, 2017

(65) Prior Publication Data

US 2018/0230365 A1 Aug. 16, 2018

Related U.S. Application Data

(60) Provisional application No. 62/458,132, filed on Feb. 13, 2017.

(51) Int. Cl.
*C09K 8/80* (2006.01)
*C09K 8/70* (2006.01)
(Continued)

(52) U.S. Cl.
CPC ............... *C09K 8/805* (2013.01); *C09K 8/70* (2013.01); *E21B 43/267* (2013.01); *C09K 8/607* (2013.01)

(58) Field of Classification Search
CPC .......... C09K 8/805; C09K 8/70; E21B 43/267
See application file for complete search history.

(56) References Cited

U.S. PATENT DOCUMENTS

| 4,964,467 A | 10/1990 | Holtmyer et al. |
| 6,686,438 B1 | 2/2004 | Beckman et al. |

(Continued)

FOREIGN PATENT DOCUMENTS

| EP | 3124741 A1 | 2/2017 |
| WO | 2009/088315 A1 | 7/2009 |
| WO | 2013192438 A2 | 12/2013 |

OTHER PUBLICATIONS

Non-Final Office Action dated Mar. 21, 2018 pertaining to U.S. Appl. No. 15/889,924, filed Feb. 6, 2018, 7 pages.

(Continued)

*Primary Examiner* — Zakiya W Bates
*Assistant Examiner* — Crystal J Miller
(74) *Attorney, Agent, or Firm* — Dinsmore & Shohl

(57) ABSTRACT

Self-suspending proppants including proppant particles coated with a $CO_2$-philic coating are provided. The $CO_2$-philic coating may be lightly crosslinked and may have a physical structure that constrains $CO_2$ molecules. Methods of making self-suspending proppants may include coating a proppant particle with a polymerizable precursor material of a $CO_2$-philic material and polymerizing the polymerizable precursor material to form a self-suspending proppant are also provided. Additionally, hydraulic fracturing fluids that may include a $CO_2$-based fluid and the self-suspending proppants and methods of treating subterranean formations (Continued)

by contacting a subterranean formation with hydraulic fracturing fluid and propagating at least one subterranean fracture are provided.

20 Claims, 3 Drawing Sheets

(51) Int. Cl.
*E21B 43/267* (2006.01)
*C09K 8/60* (2006.01)

(56) References Cited

U.S. PATENT DOCUMENTS

| | | | |
|---|---|---|---|
| 6,747,179 | B1 | 6/2004 | DeSimone et al. |
| 9,127,195 | B1 | 9/2015 | Ferrell, Jr. et al. |
| 2004/0040708 | A1 | 3/2004 | Stephenson et al. |
| 2005/0244641 | A1 | 11/2005 | Vincent |
| 2006/0258798 | A1 | 11/2006 | Richard et al. |
| 2007/0181302 | A1 | 8/2007 | Bicerano |
| 2010/0252259 | A1 | 10/2010 | Horton |
| 2010/0282462 | A1 | 11/2010 | Xu et al. |
| 2011/0036577 | A1 | 2/2011 | Bramatov et al. |
| 2012/0037371 | A1 | 2/2012 | Gupta et al. |
| 2012/0227967 | A1* | 9/2012 | Shaikh .............. C09K 8/805 166/280.1 |
| 2013/0233545 | A1 | 9/2013 | Mahoney et al. |
| 2014/0000890 | A1 | 1/2014 | Sun et al. |
| 2014/0014348 | A1 | 1/2014 | Mahoney et al. |
| 2014/0057813 | A1 | 2/2014 | Lanctot-Downs et al. |
| 2014/0060829 | A1* | 3/2014 | Nguyen .............. C09K 8/80 166/280.1 |
| 2014/0060832 | A1 | 3/2014 | Mahoney et al. |
| 2014/0144631 | A1 | 5/2014 | Weaver et al. |
| 2015/0129213 | A1* | 5/2015 | Szabo .............. E21B 43/267 166/280.2 |
| 2016/0137908 | A1* | 5/2016 | Alwattari .............. C09K 8/805 507/202 |
| 2016/0333258 | A1 | 11/2016 | Drake et al. |
| 2017/0145301 | A1* | 5/2017 | Roper .............. C09K 8/805 |

OTHER PUBLICATIONS

Non-Final Office Action dated Mar. 21, 2018 pertaining to U.S. Appl. No. 15/889,916, filed Feb. 6, 2018, 9 pages.
Non-Final Office Action dated Mar. 8, 2018 pertaining to U.S. Appl. No. 15/702,315, filed Sep. 12, 2017, 8 pages.
Johnston, Keith P., Block copolymers as stabilizers in supercritical fluids, Colloid & Interface Science, Department of Chemical Engineering, University of Texas, pp. 351-356, USA, 2000.
International Search Report and Written Opinion dated Apr. 6, 2018 pertaining to International Application No. PCT/US2018/017734, filed Feb. 12, 2018, 6 pages.
Kkazarian S.G., "Polymer Processing with Supercritical Fluids", Polymer Science, Ser. C, vol. 42, No. 1, pp. 78-101, Jan. 1, 2000.
International Search Report and Written Opinion dated Apr. 4, 2018 pertaining to International Application No. PCT/US2018/017223.
Non-Final Office Action pertaining to U.S. Appl. No. 15/922,480 dated May 7, 2018.
Non-Final Office Action pertaining to U.S. Appl. No. 15/922,489 dated May 18, 2018.
Enrick et al., Mobility and Conformance Control for Co2 EOR via Thickeners, Foams, and Gels—A Literature Review of 40 Years and Pilot Tests, Eighteenth SPE Improved Oil Recovery Symposium, 2012, Society of Petroleum Engineers, Tulsa, Oklahoma.
Mahoney et al., Self-Suspending Proppant; SPE Hydraulic Fracturing Technology Conference; 2013, Society of Petroleum Engineers, The Woodlands, Texas.
O'Neill et al., Solubility of Homopolymers and Copolymers in Carbon Dioxide, Ind. Eng. Chem. Res. 1998, 3067-3079, vol. 37, American Chemical Society.

Gregg et al., Phase Behavior of Telechelic Polyisobutylene (PIB) in Subcritical and Supercritical Fluids. 2. PIB Size, Solvent Polarity, and Inter- and Intra-Association Effects for Blank, Monohydroxy, and Dihydroxy PIB (11K) in Ethane, Propane, Carbon Dioxide, and Dimethyl Ether; Macromolecules,1994, 4981-4985, vol. 27; American Chemical Society.
Johnston et al., Water-in-Carbon Dioxide Microemulsions: An Environment for Hydrophiles Including Proteins, 1996, 624-626m vol. 271, Science Magazine.
Harrison et al., Water-in-Carbon Dioxide Microemulsions with a Fluorocarbon-Hydrocarbon Hybrid Surfactant, Langmuir, 1994, 3536-3541, vol. 10, American Chemical Society.
Mertdogan et al., Solubility of Poly(tetrafluoroethylene-co-19 mol % hexafluoropropylene) in Supercritical Co2 and Halogenated Supercritical Solvents, Macromolecules, 1996, 6548-6555, vol. 29, American Chemical Society.
Rindfleisch et al., Solubility of Polymers and Copolymers in Supercritical CO2; Journal Physical Chemistry, 1996, 15581-15587, vol. 100, American Chemical Society.
Lepilleur et al., Effect of molecular architecture on the phase behavior of fluoroether-functional graft copolymers in supercritical CO2; Fluid Phase Equilibria, 1997, 285-305, vol. 134, Elsevier Science B.V.
Mesiano et al., The phase behavior of fluorinated diols, divinyl adipate and fluorinated polyester in supercritical carbon dioxide, Fluid Phase Equilibria, 2001, 169-177, vol. 178, Elsevier Science B.V.
McHugh et al., Solubility of CF2-Modified Polybutadiene and Polyisoprene in Supercritical Carbon Dioxide, Macromelecules, 2002, 4653-4657, vol. 35, American Chemical Society.
Hoefling et al., Effect of Structure on the Cloud-Point Curves of Silicone-Based Amphiphiles in Supercritical Carbon Dioxide, The Journal of Supercritical Fluids, 1993, 165-171, vol. 6, PRA Press.
Bayraktar et al., Miscibility, Phase Separation, and Volumetric Properties in Solutions of Poly(dimethylsiloxane) in Supercritical Carbon Dioxide, Journal of Applied Polymer Science, 2000, 1397-1403, vol. 75, John Wiley & Sons, Inc. 2000.
Kazarian et al., Specific Intermolecular Interaction of Carbon Dioxide with Polymers, Journal of American Chemical Society, 1996, 1729-1736, vol. 118; American Chemical Society.
Sarbu et al., Design and Synthesis of Low Cost, Sustainable Co2-philes, Ind. Eng. Chem. Res., 2000, 4678-4683, vol. 39, American Chemical Society.
Sarbu et al., Non-fluorous polymers with very high solubility in supercritical Co2 down to low pressures, MacMillan Magazines Ltd., 2000, 165-168, vol. 405, www.Nature.com.
Drohmann et al., Phase behavior of polymers containing ether groups in carbon dioxide; The Journal of Supercritical Fluids, 2002, 103-110, vol. 22; Elsevier Science.
Conway et al., Poly(lactide-co-glycolide) Solutions Behavior in Supercritical Co2, CHF3, and CHClF2; Journal of Applied Polymer Science, 2001, 1155-1161, vol. 80, John Wiley & Sons, Inc.
Fink et al., Toward the Development of "Co2-philic" Hydrocarbons. 1. Use of Side-Chain Functionalization to Lower the Miscibility Pressure of Polydimethylsiloxanes in Co2; Journal of Phys. Che., 1999, 6441-6444, vol. 3, American Chemical Society.
Shen et al., Co2-solubility of oligomers and polymers that contain the carbonyl group, Polymer, 2003, 1491-1498, vol. 44; Elsevier Science Ltd.
Raveendran et al., Cooperative C—H . . . O Hydrogen Bonding in CO2—Lewis Base Complexes: Implications for Solvation in Supercritical Co2, JACS Articles, 2002, 12590-12599, vol. 24, Journal American Chemistry Society.
Blatchford et al., Raman Spectroscopic Evidence for Cooperative C—H . . . O Interactions in the Acetaldehyde-CO2 Complex, JACS Communications, 2002,14818-14819, vol. 124, Journal American Chemistry Society.
Hu et al., Evaluation of Co2-Philicity of Poly(vinyl acetate) and Poly(vinyl acetate-alt-maleate) Copolymers through Molecular Modeling and Dissolution Behavior Measurement, The Journal of Physical Chemistry, 2015, 3194-3204, vol. 19, American Chemical Society.

(56) References Cited

OTHER PUBLICATIONS

Mahmood; Study of volume swelling and interfacial tension of the polystyrene-carbon dioxide-dimethyl ether system, Journal of Colloid and Interface Science, 2015, 174-181, vol. 456, Elsevier Inc.

* cited by examiner

SELF-SUSPENDING PROPPANTS FOR USE IN CARBON DIOXIDE-BASED FRACTURING FLUIDS AND METHODS OF MAKING AND USE THEREOF

CROSS REFERENCE TO RELATED APPLICATIONS

This application claims the benefit of priority to U.S. Provisional Application Ser. No. 62/458,132, filed Feb. 13, 2017, which is incorporated by reference in its entirety.

BACKGROUND

Field

Embodiments of the present disclosure generally relate to self-suspending proppant systems. Specifically, embodiments of the present disclosure relate to self-suspending proppants and methods of making the same, and carbon dioxide-based hydraulic fracturing fluids and methods of using the same to treat subterranean formations.

Technical Background

Carbon dioxide ($CO_2$) may be used in hydraulic fracturing fluids to provide non-aqueous alternatives to conventional water-based fluids, as some subterranean formations may be sensitive to water. Moreover, 'water-less' fluids are more environmentally sound, minimizing depletion of natural-source freshwater often consumed in fracturing applications. However, conventional $CO_2$-based fluids are not sufficiently viscous to suspend propping agents, such as "proppants," that are added to fracturing fluids to hold open subterranean fractures during and following fracturing treatment. Because of this reduced ability to suspend proppants, $CO_2$-based fluids have not been widely considered for use in fracturing fluids.

Accordingly, a need exists for non-aqueous hydraulic fracturing fluids that adequately support and suspend proppant particles. Historically, it has been very difficult to thicken $CO_2$-based fluids using additives, as $CO_2$ is not a good solvent for high molecular-weight polymers. Though water-based fluids may be easily viscosified owing to the many available thickening agents that readily dissolve in water, $CO_2$-based fluids are not easily viscosified, owing to a lack of available materials that are $CO_2$-soluble.

SUMMARY

Some embodiments of the present disclosure are directed to self-suspending proppants that include proppant particles coated with a $CO_2$-philic coating. The $CO_2$-philic coating is lightly crosslinked and has a physical structure that constrains or is solvated by $CO_2$ molecules.

Further embodiments of the present disclosure include hydraulic fracturing fluids composed of a $CO_2$-based fluid and a self-suspending proppant. The self-suspending proppant is a proppant particle coated with a $CO_2$-philic coating. The $CO_2$-philic coating is lightly crosslinked and has a physical structure that constrains $CO_2$ molecules.

Still further embodiments of the present disclosure include methods of producing self-suspending proppants. The methods of producing self-suspending proppants include coating a proppant particle with a polymerizable precursor material that includes a $CO_2$-philic component to form a coated proppant, and polymerizing the polymerizable precursor material to form the self-suspending proppant. The self-suspending proppant is a proppant particle coated with a $CO_2$-philic coating. The $CO_2$-philic coating is lightly crosslinked and has a physical structure that constrains $CO_2$ molecules.

Still further embodiments of the present disclosure include methods for treating subterranean formations. The methods for treating subterranean formations include contacting a subterranean formation with a hydraulic fracturing fluid comprising self-suspending proppant particles, and propagating at least one subterranean fracture in the subterranean formation. The hydraulic fracturing fluids composed of a $CO_2$-based fluid and a self-suspending proppant. The self-suspending proppant is a proppant particle coated with a $CO_2$-philic coating. The $CO_2$-philic coating is lightly crosslinked and has a physical structure that constrains $CO_2$ molecules.

BRIEF DESCRIPTION OF THE DRAWINGS

The following detailed description of specific embodiments of the present disclosure can be best understood when read in conjunction with the following drawings.

DETAILED DESCRIPTION

Figure 1:
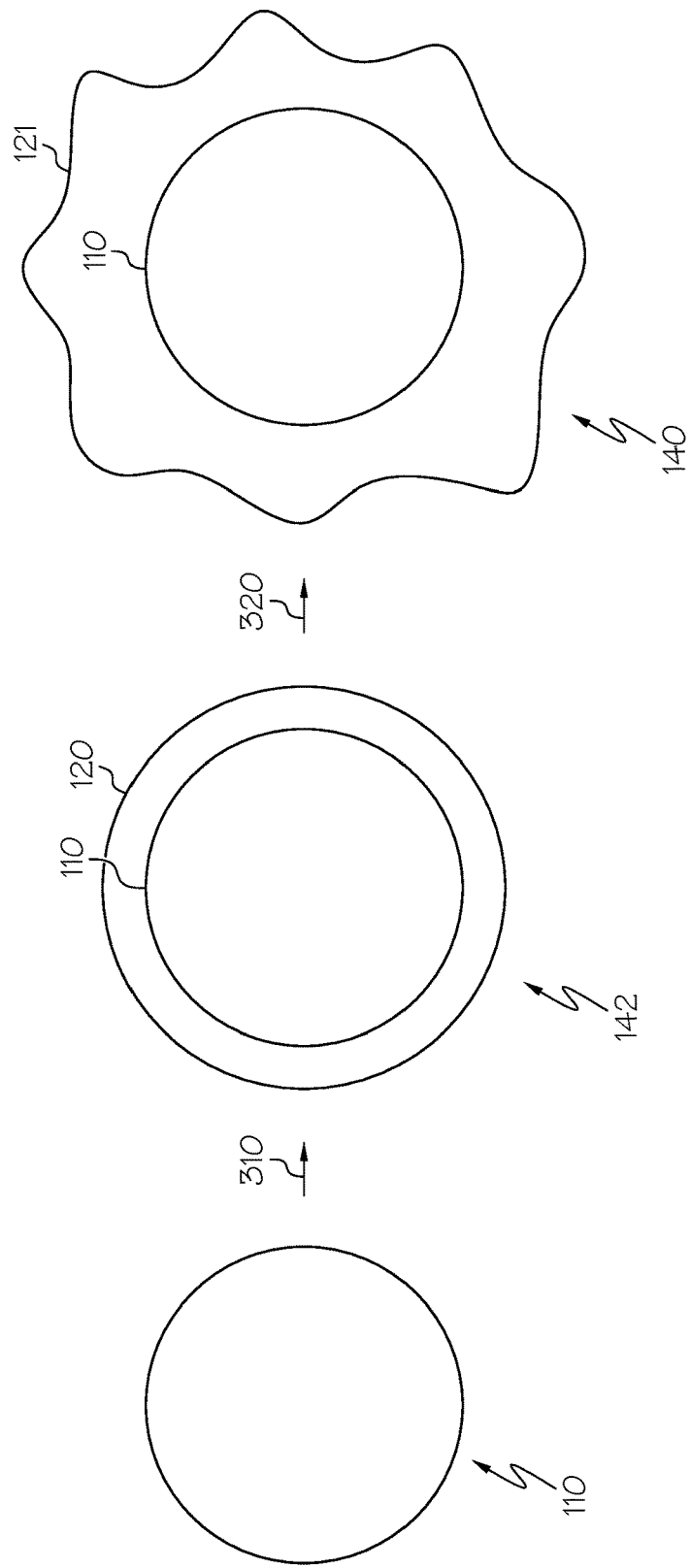
FIG. 1 is a schematic view of a proppant, a coated proppant, and a self-suspending proppant, according to embodiments shown and described.

Embodiments of the present disclosure are directed to self-suspending proppants that include proppant particles coated with a $CO_2$-philic coating. The $CO_2$-philic coating may be lightly crosslinked and may have a physical structure that constrains $CO_2$ molecules. The proppant particle coated with the $CO_2$-philic coating may be suspendable in $CO_2$-based fluids such as hydraulic fracturing fluids, for example. The hydraulic fracturing fluids may be used in methods for treating subterranean formations. Embodiments also include methods of making the self-suspending proppants and of making hydraulic fracturing fluids comprising self-suspending proppants. Further embodiments include methods of using hydraulic fracturing fluids to treat a subterranean formation.

Subterranean formations such as rock, coal, or shale are treated by pumping a hydraulic fracturing fluid containing proppants into an opening in the formation to aid propagation of a fracture. The pressure of the injecting fluid causes the formation to fracture, and while the fluid is allowed to flow back to the surface, the proppants remain in the fracture and prevent the formation from closing or collapsing. Conventionally, $CO_2$-based fracturing fluids have such a low viscosity that proppant particles added to the fluid immediately sink and are not pumped into the fracture until the last of the fluid has been used. As a result, the fracture may close prematurely.

Embodiments of the present disclosure address these difficulties by providing self-suspending proppant particles for use in $CO_2$-based fluids and simplified, economical methods for treating subterranean formations with hydraulic fracturing fluids containing the self-suspending proppant particles suspended in a $CO_2$-based fluid. The self-suspending proppants are proppant particles coated with a $CO_2$-philic material that is lightly crosslinked and has a physical structure that can constrain $CO_2$ molecules. As used throughout the disclosure, "$CO_2$-philic" refers to a molecule, ion, polymer, or composition having an affinity or attraction to $CO_2$. The term "$CO_2$-based fluid" refers to a fluid that includes $CO_2$.

Specific embodiments will now be described with references to the figures. Whenever possible, the same reference numerals will be used throughout the drawings to refer to the same or like parts. As used throughout this disclosure, the singular forms "a," "an" and "the" include plural referents unless the context clearly dictates otherwise. Thus, for example, reference to "a" component includes aspects having two or more such components, unless the context clearly indicates otherwise.

FIG. 1 schematically portrays three states of a proppant particle 110. On the left, an uncoated proppant particle 110 is depicted in a first, uncoated state. Then, in the middle, a coated proppant particle 142 is depicted in which the proppant particle 110 is in a second, coated state. Finally, on the right is a swollen self-suspending proppant 140, in which the proppant particle 110 is in a third, swollen state. In the first state, the proppant particle 110 is not coated and, when placed in a $CO_2$-based fluid, it would likely sink to the bottom of the fluid on account of the low viscosity of $CO_2$-based fluids. In the second state, the proppant particle 110 has undergone a coating step 310 to be coated with a $CO_2$-philic coating 120, forming a coated proppant particle 142. In the third state, the coated proppant particle 142 has undergone a contacting step 320 to be contacted with $CO_2$ molecules, forming a swollen self-suspending proppant 140 that is coated with a now swollen $CO_2$-philic coating 121. Upon contact with $CO_2$ molecules during the contacting step 320, the $CO_2$-philic coating 120 has volumetrically expanded to a swollen state, transforming the coated proppant particle 142 into a swollen self-suspending proppant 140.

As illustrated by FIG. 1, in some embodiments, the coated proppant particle 142 and the swollen self-suspending proppant 140 both include at least one proppant particle 110 coated with a $CO_2$-philic coating 120, 121. The proppant particle 110 may be chosen from any type of proppant suitable for use in hydraulic fracturing applications. As previously described, proppants are propping agent particles used in hydraulic fracturing fluids to maintain and hold open subterranean fractures during or following subterranean treatment. In some embodiments, the proppant particle 110 may comprise particles of materials such as oxides, silicates, sand, ceramic, resin, plastic, mineral, glass, or combinations thereof. For instance, the proppant particle 110 may comprise graded sand, treated sand, resin-coated sand, ceramic proppants, plastic proppants, low-density proppants, or other resin-coated materials. The proppant particle 110 may comprise particles of bauxite or of sintered bauxite. The proppant particle 110 may comprise glass particles or glass beads. Embodiments of the present disclosure may utilize at least one proppant particle 110 and in embodiments in which more than one proppant particle 110 is used, the proppant particles 110 may contain a mixture of two or more different materials or three or more different materials.

The material of the proppant particle 110 may be chosen based on the particular application and characteristics desired in a swollen self-suspending proppant 140. For instance, ceramic proppant materials may be suitable in embodiments desiring high strength, uniform size and shape, high thermal resistance and high conductivity. Fully or partially cured resin-coated sand may be chosen in embodiments to provide particles of irregular size and shape with medium crush resistance strength and medium conductivity. Sands may be chosen in embodiments desiring naturally occurring and cost effective proppants or low particle strength and low conductivity.

The proppant particle 110 may have any size and shape. In some embodiments, the one or more proppant particles 110 may have sizes from 8 mesh to 140 mesh (diameters from 106 micrometers (μm) to 2.36 millimeters (mm)). In some embodiments, the proppant particles 110 may have sizes from 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles 110 may also vary based on the desired application.

In some embodiments, the proppant particles 110 may have a rough surface that may increase adhesion of the $CO_2$-philic coating 120 to the proppant particle 110 and may increase interaction of $CO_2$ with the $CO_2$-philic coating 120. The proppant particles 110 may be roughened to increase the surface area of the proppant particle 110 by any suitable physical or chemical method, including, for example, using an appropriate etchant. In some embodiments, the proppant particle 110 may have a surface that provides a desired adherence of the $CO_2$-philic coating 120 to the proppant particle 110 or may already be sufficiently rough without a need for chemical or physical roughening.

The term "rough" refers to a surface having at least one deviation from the normalized plane of the surface, such as a depression or protrusion. The surface may be uneven and irregular and may have one or more imperfections, such as dimples, stipples, bumps, projections or other surface defects. The rough surface may have an arithmetic average roughness ($R_a$) of greater than or equal to 1 nanometer (nm) (0.001 μm). $R_a$ is defined as the arithmetic average of the differences between the local surface heights and the average surface height and can be described by Equation 1, contemplating n measurements:

$$R_a = \frac{1}{n}\sum_{i=1}^{n}|y_i| \qquad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle 110 may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

As previously described, "$CO_2$-philic" refers to a molecule, ion, polymer, or composition having an affinity or attraction to $CO_2$. A $CO_2$-philic material possesses a tendency to mix with, dissolve in, or be wetted by $CO_2$. In some embodiments, the $CO_2$-philic material may be attracted to $CO_2$ molecules through intermolecular forces such as van der Waals forces or through hydrogen bonding. The $CO_2$-philic coating 120 may be any coating formed from a material or combination of materials that has a chemical or physical affinity to $CO_2$. The physical affinity of the $CO_2$-philic coating 120 may include, for example, being capable of absorbing or adsorbing $CO_2$ molecules.

In some embodiments, the $CO_2$-philic coating 120 may include or may consist of oxygen-containing molecules such as polysaccharide acetates, polyethylene glycols, ethylene glycol-containing polymers, partially fluorinated oxygen-containing polymers, oxygenated polymers, crosslinked oxygen-containing polystyrenes, polyvinyl acetates, or combinations thereof. For instance, in some embodiments, the $CO_2$-philic coating 120 may be a polysaccharide acetate, such as cellulose acetate. The $CO_2$-philic coating 120 in some embodiments may include $CO_2$-philic materials having silicon-containing groups. Examples of $CO_2$-philic materials having silicon-containing groups include polysiloxanes, such as those which include monomeric units such as alkylsiloxanes, fluoroalkylsiloxanes, or chloroalkylsiloxanes. Examples of suitable alkylsiloxanes include dimethyl siloxanes and polydimethylsiloxanes. The $CO_2$-philic coating 120 may comprise halogen compounds (such as fluorine-containing compounds) or compounds having halogenated carbons (for example, fluorocarbons). The $CO_2$-philic coating 120 may comprise branched polyalkylene oxides or fluorinated polyethers, for example. In some embodiments, the $CO_2$-philic coating 120 may comprise a fluoropolymer. In some embodiments, the $CO_2$-philic coating 120 may comprise ethylene glycol-containing polymers made from di(ethylene glycol) monomethyl ether methacrylate or poly(ethylene glycol) methyl ether methacrylate crossklinked with ethylene glycol dimethacrylate or di(ethylene glycol) dimethacrylate (DEGDMA).

In some embodiments, the $CO_2$-philic coating 120 may be formed from monomeric materials or from oligomeric materials such as, for example, oligomers having 8 or fewer monomer units. The $CO_2$-philic coating 120 may be an oligomer containing less than or equal to 8 repeating monomers, such as α or fewer repeating monomers or 3 or fewer repeating monomers. In some embodiments, the $CO_2$-philic coating 120 may be a fluoride-containing oligomer. The $CO_2$-philic coating 120 may be a fluoride-containing oligomer having 8 or fewer repeating monomer units, or 5 or fewer repeating monomer units, or 3 or fewer monomer units. The fluoropolymers may be formed from monomers including, as non-limiting examples, fluoroacrylate monomers such as 2-(N-ethylperfluorooctane-sulfonamido) ethyl acrylate ("EtFOSEA"), 2-(N-ethylperfluorooctane-sulfonamido) ethyl methacrylate ("EtFOSEMA"), 2-(N-methylperfluorooctane-sulfonamido) ethyl acrylate ("MeFOSEA"), 2-(N-methylperfluorooctane-sulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylates, 1,1', 2,2'-tetrahydroperfluoroalkyl-methacrylates and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether).

The $CO_2$-philic coating 120 may comprise a polyether-based polymer including, but not limited to polyethers substituted with at least one side group, which may include one or more groups that interact favorably with or has an affinity for $CO_2$ (such as a Lewis base group), a poly(ether-carbonate), a poly(ether-carbonate) substituted with at least one side group including a Lewis base, a vinyl polymer substituted with at least one side group including a Lewis base, a poly(ether-ester) or a poly(ether-ester) substituted with at least one side group including a Lewis base. One possible non-limiting example of a Lewis base is an amino functional group.

While embodiments of suitable $CO_2$-philic materials were described mainly with reference to the $CO_2$-philic coating 120, it should be understood that the $CO_2$-philic materials are equally applicable to the swollen $CO_2$-philic coating 121, which may be in accordance with any of the embodiments of $CO_2$-philic materials previously described.

In some embodiments, the $CO_2$-philic coating 120 may have hydrophobic tendencies, such as a lack of attraction to water, repulsion to water, or immiscibility in water. The $CO_2$-philic coating 120 may not substantially dissolve (does not dissolve more than 10 weight percent (wt. %) or more than 8 wt. %, or more than 5 wt. % or more than 3 wt. %) when contacted with, submerged in, or otherwise exposed to water. In some embodiments, the $CO_2$-philic coating 120 may not dissociate from the proppant particle 110 when the self-suspending proppant 140 is added to a water-based fluid, such as water or a fluid that includes water. In some embodiments, the $CO_2$-philic coating 120 of a coated proppant particle 142 or the swollen $CO_2$-philic coating 121 of a swollen self-suspending proppant 140 does not dissociate from the proppant particle 110 when the self-suspending proppant 140 is contacted, exposed, or placed in a fluid medium having at least 20 wt. % water based on the total weight of the fluid medium. In other embodiments, the $CO_2$-philic coating 120 of a coated proppant particle 142 or the swollen $CO_2$-philic coating 121 of a swollen self-suspending proppant 140 does not substantially dissociate (does not dissipate more than 10 wt. %, or more than 8 wt. %, or more than 5 wt. % or more than 3 wt. %) from the proppant particle 110 when the self-suspending proppant 140 is contacted, exposed, or placed in a fluid medium having at least 30 wt. % water, or at least 50 wt. % water, or at least 75 wt. % water. Dissolution of the $CO_2$-philic coating in a fluid medium may be determined by any suitable analytical technique for detection of solvated coating material that is performed on a fluid medium to which a coated proppant particle 142 has been added and allowed to equilibrate at room temperature for at least 24 hours.

Similarly, the $CO_2$-philic coating 120 may repel water, may not be attracted to water, or may not be miscible in water. Therefore, in some embodiments, the $CO_2$-philic coating 120 of a coated proppant particle 142 may not swell when the coated proppant particle 142 is added to a water-based fluid, such as water or a fluid containing water. In some embodiments, the $CO_2$-philic coating 120 of a coated proppant particle 142 may not swell when the coated proppant particle 142 is contacted with, exposed to, or placed in a fluid medium having at least 20 wt. % water based on the total weight of the fluid medium. In other embodiments, the $CO_2$-philic coating 120 may not swell when the coated proppant particle 142 is present in a fluid medium having at least 30 wt. % water, or at least 50 wt. % water, or at least 75 wt. % water.

As a non-limiting example, a batch of coated proppant particles 142 having the same $CO_2$-philic coating 120 is tested in which half of the batch is added to a $CO_2$-based fluid 130 and the other half of the batch is added to water. The $CO_2$-philic coating 120 of the coated proppant particles 142 added to the $CO_2$-base fluid exhibit a swelling (as measured based on the volumetric expansion of the particles before and after addition to the fluid after 30 minutes, as previously described) of at least 2 times, at least 3 times, at least 5 times, at least 50 times, or at least 100 times the amount of the swelling the coated proppants 142 added to water exhibit. In some embodiments, when added to water, the $CO_2$-philic coating 120 of a coated proppant particle 142 may swell less than or equal to 1/10 the amount the $CO_2$-philic coating 120 of a coated proppant particle 142 swells when added to a $CO_2$-based fluid 130. In some embodiments, the $CO_2$-philic coating 120 of a coated proppant particle 142 when added to water may swell less than or equal to 1/2, or less than or equal to 1/3, or less than or equal to 1/100, or less than or equal to 1/1,000 the amount the $CO_2$-philic coating 120 of a coated proppant particle 142 swells when added to a $CO_2$-based fluid 130.

Referring again to FIG. 1, in one or more embodiments, the proppant particle 110 may be coated with a $CO_2$-philic coating 120 during a coating step 310 to produce, form, or result in a swollen self-suspending proppant 140. In some embodiments, the $CO_2$-philic coating 120 may be a surface layer on or bound to the proppant particle 110. Such a surface layer may cover at least a portion of the surface of the proppant particle 110. For example, the $CO_2$-philic coating 120 may coat, overlay, enclose, envelop, or otherwise surround the proppant particle 110 with the coating. The $CO_2$-philic coating 120 may cover the entire surface of the proppant particle 110 (as shown) or, alternatively, may only partially surround the proppant particle 110 (not shown), leaving at least a portion of surface of the proppant particle 110 uncoated or otherwise exposed.

The $CO_2$-philic coating 120 in some embodiments may be lightly crosslinked. As used throughout this disclosure, "lightly crosslinked" refers to partial crosslinking, meaning that at least one crosslinkable site is not crosslinked. For some embodiments described throughout this disclosure, a "lightly crosslinked" $CO_2$-philic coating 120 may exhibit volumetric swelling of at least 25% at room temperature in the presence of $CO_2$-based fluid to form the swollen $CO_2$-philic coating 121. Without intent to be bound by theory, it is believed that greater degrees of crosslinking in the $CO_2$-philic coating 120 may result in a maximum volumetric swelling of the swollen $CO_2$-philic coating 121 of less than 25% at room temperature in the presence of $CO_2$-based fluid. Furthermore, it is believed that in some highly crosslinked polymeric $CO_2$-philic materials, the rigidity of the polymer segments between crosslink junctions are short and inflexible, such that swelling does not occur when carbon dioxide solvates the polymer segments of such materials. The degree of crosslinking may be controlled by the molar or weight ratio of crosslinkers to monomers used as reactants for forming the $CO_2$-philic coating 120. A suitable degree of crosslinking may be determined empirically by measuring degrees of swelling in different $CO_2$-based fluids as a function of temperature and pressure for polymers prepared with varying crosslinker to monomer ratios. Additionally, highly crosslinked coatings may not exhibit an optimal physical structure for constraining or accommodating $CO_2$ and, therefore, may not exhibit optimal volumetric expansion from the non-swollen state to the swollen state. In contrast, a lightly crosslinked swollen $CO_2$-phillic coating 121 may retain its shape without dissolving in the fluid system, while maintaining a sufficient attraction or bond to the proppant particle 110.

In some embodiments, a lightly crosslinked $CO_2$-philic coating 120 may constrain $CO_2$ molecules. In some embodiments, the light crosslinking may create a polymeric network having spaces or voids that accommodate $CO_2$ molecules. Without intent to be bound by theory, it is believed that the physical structure of the coating may draw in $CO_2$ as a result of an attraction between the $CO_2$-philic coating 120 and $CO_2$ molecules to form the swollen $CO_2$-philic coating 121. As the $CO_2$ molecules are drawn into the $CO_2$-philic coating 120, the $CO_2$-philic coating 120 may constrain or be solvated with one or more $CO_2$ molecules to form the swollen $CO_2$-philic coating 121. In turn, the coated proppant particle 142 may undergo a volumetric expansion from a non-swollen to a swollen state, resulting in a swollen self-suspending proppant 140. Constraint of one or more $CO_2$ molecules may occur by sorption, for example. Sorption may include physical or chemical adsorption of the $CO_2$ molecules, physical or chemical absorption of the $CO_2$ molecules, or any combination of these.

As used throughout this disclosure, "volumetric expansion (E)" refers to the difference of the volume ($V_1$) of a particular number of coated proppant particles in the swollen state and the volume ($V_0$) of the same number of coated proppant particles in the non-swollen state, divided by the volume ($V_0$) of the coated proppant particles in the non-swollen state in accordance with Equation 2:

$$E=(V_1-V_0)/(V_0) \qquad \text{EQUATION 2}$$

To express volumetric expansion as a percent, E may be multiplied by 100. The respective volumes of a coated proppant particle 142 (in the non-swollen state) and the volume of a swollen self-suspending proppant 140 (in the swollen state) include the combined volume of both the proppant particle 110 and the $CO_2$-philic coating 120.

In some embodiments, the coated proppant particle 142 may volumetrically expand from a non-swollen state to a swollen state. The $CO_2$-philic coating 120 of the coated proppant particle 142 may volumetrically expand when $CO_2$ is constrained within the physical structure of the coating, forming a swollen $CO_2$-philic coating 121 resulting in a swollen self-suspending proppant 140. In some embodiments, the swollen self-suspending proppant 140 may exhibit a volumetric expansion of at least 100% from a non-swollen state to a swollen state. In some embodiments, the swollen self-suspending proppant 140 may volumetrically expand at least 10%, at least 15%, at least 20%, at least 25%, at least 50%, at least 200%, or at least 300% from the non-swollen state to the swollen state. Without being bound by theory, such an expansion may increase the buoyancy of the swollen self-suspending proppant 140 and may facilitate or give rise to the suspension of particles in $CO_2$-based fluids 130, as shown in FIG. 2B.

In some embodiments, at least in part because of this volumetric expansion, the density of the swollen self-suspending proppants 140 may be less than, equal to, or only slightly greater than the density of the $CO_2$-based fluid 130. In some embodiments, the swollen self-suspending proppant 140 may have a density of less than or equal to 10% of the density of the $CO_2$-based fluid 130, for example. The density of the swollen self-suspending proppant 140 may be less than or equal to 50%, or less than or equal to 70%, or less than or equal to 85%, or less than or equal to 90% of an unswollen proppant. In some embodiments, one or more viscosifiers may be added to the $CO_2$-based fluid 130, such that the density of the swollen self-suspending proppant 140 may be less than or equal to 100%, or less than or equal to 125%, or less than or equal to 150%, or less than or equal to 200%, or less than or equal to 250%, or less than or equal to 300% of the density of the $CO_2$-based fluid 130. The density of the swollen self-suspending proppant 140 may be from 25% to 200% of the density of the $CO_2$-based fluid 130. In some embodiments, the density of the swollen self-suspending proppant 140 may be from 25% to 125%, or from 50% to 200%, or from 50% to 125%, or from 75% to 150%, or from 75% to 200%, or from 25% to 100%, or from 25% to 110% of the density of the $CO_2$-based fluid 130. The difference in density may cause the swollen self-suspending proppants 140 to suspend in the $CO_2$-based fluid 130 without sinking to the bottom or otherwise coalescing in the fluid. The difference in density may reduce or eliminate the need for additional viscosifiers to be added to the $CO_2$-based fluid 130.

As previously described, a "$CO_2$-based fluid" refers to a fluid that includes $CO_2$. In some embodiments, the $CO_2$-based fluid 130 may comprise at least 30 wt. % $CO_2$, based on the total weight the $CO_2$-based fluid 130 before the $CO_2$-based fluid 130 is contacted with a swollen self-suspending proppant 140. In some embodiments, the $CO_2$-based fluid 130 may comprise at least 45 wt. % or at least 51 wt. % $CO_2$. In some embodiments, the $CO_2$-based fluid 130 may comprise at least 60 wt. %, or at least 75 wt. %, or at least 85 wt. %, or at least 90 wt. % $CO_2$. In some embodiments, the $CO_2$-based fluid 130 may comprise liquid $CO_2$ or gaseous $CO_2$. In some embodiments, the $CO_2$-based fluid 130 may comprise supercritical, subcritical, or critical $CO_2$.

As used throughout this disclosure, "supercritical" refers to a substance at a pressure and a temperature greater than those of the substance's critical point, such that distinct phases do not exist and the substance may exhibit the diffusion of a gas while dissolving materials like a liquid. Similarly, "subcritical" refers to a substance with a pressure and a temperature of less than those of the substance's critical point, such that distinct phases exist. Likewise, "critical" refers to a substance that is at a pressure and temperature equal to those of the substance's critical point. In some embodiments, the $CO_2$-based fluid 130 may be supercritical $CO_2$. In some embodiments, the $CO_2$-based fluid 130 may be liquid $CO_2$. In some embodiments, the $CO_2$-based fluid 130 may include substances other than $CO_2$. The $CO_2$-based fluid 130 may contain additional fluids or gasses, including but not limited to $N_2$, dimethyl ether, or hydrocarbons.

Still referring to FIG. 1, further embodiments of the present disclosure are directed to methods for producing self-suspending proppants 140, 142. In some embodiments, the method may include a coating step 310 in which a proppant particle 110 is coated with a monomeric precursor material capable of forming a $CO_2$-philic material upon polymerization to form a self-suspending proppant. The precursor material may include monomers and, optionally one or more crosslinking agents. In some embodiments, as previously discussed, the degree of crosslinking may be controlled by the molar or weight ratio of crosslinkers to monomers to achieve a coating that is lightly crosslinked.

In some embodiments, the coating step 310 may include contacting the polymerizable precursor material with the proppant particle 110 in a fluidized bed process. In some embodiments, the coating step 310 may include a stationary, bubbling, circulation, or vibratory fluidized bed process. In some embodiments, the coating step 310 may include spraying or saturating the proppant particles 110 with a $CO_2$-philic polymer or polymer precursor. The coating step 310 may include, in some embodiments, tumbling or agitating the coated proppant to prevent agglomeration or clumping. The coating step 310 may include mixing a $CO_2$-philic material with another compound such as, for example, a solvent, an initiator, an adhesion promoter, or an additive, to form the $CO_2$-philic coating 120. In some embodiments, the coating process may be conducted in an emulsion coating technique. In some embodiments, the adhesion promoter may comprise a silane (for example, amino silane) or a silane-containing monomer. In some embodiments, an adhesion promoter may not be necessary to coat the proppant particles 110.

The methods for producing a self-suspending proppant may include polymerizing a polymerizable precursor material that has been coated onto the proppant particle 110 during the coating step 310. In some embodiments, the polymerizable precursor materials may incorporate a polymerization initiator compound. In some embodiments, polymerizing the polymerizable precursor material may include heating the coated proppant to a temperature sufficient to polymerize at least a portion of the precursor material. The heating may include application of heat by any suitable process such as by forced hot air heating, convection, friction, conduction, combustion, exothermic reactions, microwave heating, or infrared radiation, for example. The coated proppant particle may be heated at a polymerization temperature and for a polymerization time sufficient to crosslink at least a portion of the polymerizable precursor material. In some embodiments, the polymerization step may include subjecting the coated proppant to ultraviolet (UV) light or any other polymerization techniques known in the art. The precursor material may be polymerized at conditions sufficient to crosslink at least a portion of the precursor material.

In some embodiments, the methods for producing a self-suspending proppant may further comprise roughening the proppant particles 110 before the coating step 310. The proppant particles 110 may be chemically or physically roughened, as previously described. In some embodiments, roughening the proppant particles 110 may produce rough particle surfaces with an arithmetic average roughness ($R_a$) of greater than or equal to 0.001 µm (1 nm). In some embodiments, the rough particle surfaces may have an $R_a$ of greater than or equal to 0.002 µm (2 nm), 0.005 µm (5 nm), or greater than or equal to 0.01 µm (10 nm), or greater than or equal to 0.05 µm (50 nm), or greater than or equal to 0.1 µm (100 nm), or greater than or equal to 0.5 µm, or greater than or equal to 1 µm when measured as previously discussed.

The method for producing a self-suspending proppant may include coating the proppant particle 110 using a two-layer coating or multi-layered coating system. The method in some embodiments may further include coating proppant particles 110 with a top coating. The top coating may be an overlying layer that may be added for additional properties or features. As a non-limiting example, additional coatings may be used in conjunction with, or may comprise a breaker. As used throughout this disclosure, a "breaker" refers to a compound that may break or degrade the polymers of the coating after a fracturing operation to prevent formation damage. In some embodiments, the breaker may be an oxidizer or enzyme breaker. The breaker may be any suitable materials capable of degrading a coating material.

Figure 2A:
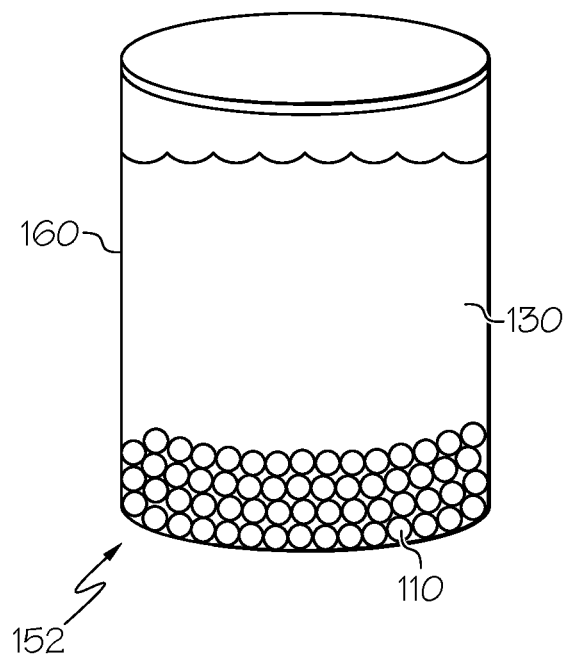
FIG. 2A is a schematic view of a hydraulic fracturing fluid comprising uncoated proppants.
Figure 2B:
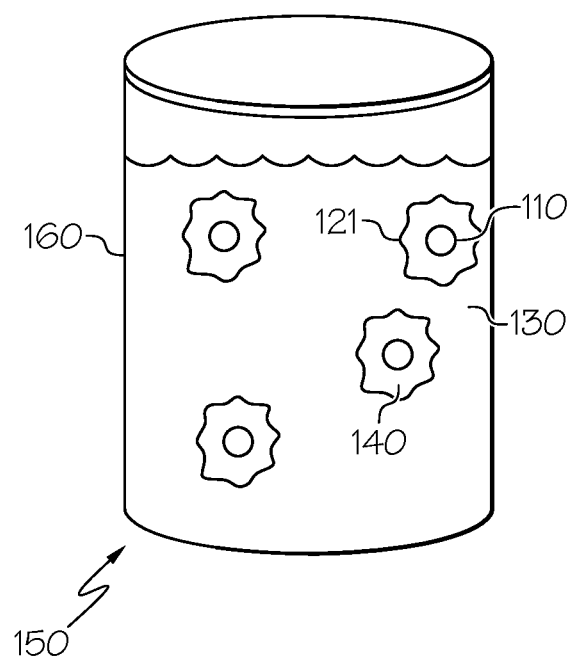
FIG. 2B is a schematic view of a hydraulic fracturing fluid according to embodiments shown and described.

Referring to FIG. 2A, a container 160 of conventional hydraulic fracturing fluid 152 is schematically illustrated to show how uncoated proppant particles 110 react when added to a $CO_2$-based fluid 130. The conventional hydraulic fracturing fluid 152 includes uncoated proppant particles 110 in a $CO_2$-based fluid 130. As shown, the uncoated proppant particles 110 sink to the bottom of the container 160, as the conventional hydraulic fracturing fluid 152 is not sufficiently viscous to support the particles without the aid of additional viscosifying means. Settled proppant particles 110 may cause problems in hydraulic fracturing processes. Mitigation of these problems typically requires use of turbulence, or additions of viscosifiers or other ingredients to the conventional $CO_2$-based hydraulic fracturing fluid 152 to ensure that the proppant particles 110 suspend in the $CO_2$-based fluid 130. These additional required steps and products may increase the time and costs associated with subterranean treatment.

In contrast, FIG. 2B depicts a container 160 of hydraulic fracturing fluid 150 according to the present embodiments. FIG. 2B schematically illustrates the effect of a coated proppant particle 142 (as shown in FIG. 1) once placed in $CO_2$-based fluid 130. Once placed in $CO_2$-based fluid 130, as previously discussed, the $CO_2$-philic coating 120 (shown in FIG. 1) of the coated proppant particle 142 volumetrically expands to form a swollen self-suspending proppant 140. The hydraulic fracturing fluid 150 of the present disclosure, as shown in FIG. 2B, contains swollen self-suspending proppants 140 including proppant particles 110 coated with a swollen $CO_2$-philic coating 121. Without being bound by theory, the swollen self-suspending proppants 140 of the present disclosure may overcome the difficulties faced when using conventional hydraulic fracturing fluid 152, as previously discussed, by stabilizing a suspension in hydraulic fluid through the ability of the $CO_2$-philic coating 120 to volumetrically expand upon contact with $CO_2$ to result in a swollen $CO_2$-philic coating 121. The swollen self-suspending proppant 140 may be in accordance with any of the embodiments previously described in which the swollen self-suspending proppant 140 comprises a proppant particle 110 that has been coated with a $CO_2$-philic coating 120 and contacted with $CO_2$ to form the swollen $CO_2$-philic coating 121.

The hydraulic fracturing fluid 150 of FIG. 2B contains swollen self-suspending proppants 140 suspended in the $CO_2$-based fluid 130. As discussed, in some embodiments, the $CO_2$-philic coating 120 may at least partially constrain (such as through sorption) $CO_2$ present in the $CO_2$-based fluid 130 to produce the swollen $CO_2$-philic coating 121. The constrained $CO_2$ molecules may cause the $CO_2$-philic coating 120, and thus, the swollen self-suspending proppants 140, to volumetrically expand to a swollen state. The swollen self-suspending proppants 140 may become less dense, more buoyant in the $CO_2$-based fluid, or both, as a result of the constrained $CO_2$ molecules in the swollen $CO_2$-philic coating 121. The decreased density or increased buoyancy of the swollen self-suspending proppants 140 may facilitate or enable the particles to self-suspend in the $CO_2$-based fluid 130.

Embodiments of methods for preparing a hydraulic fracturing fluid 150 may include contacting the coated proppant particle 142 of any of the embodiments previously discussed with a $CO_2$-based fluid 130 containing $CO_2$ to form a hydraulic fracturing fluid 150. The hydraulic fracturing fluid 150 may be in accordance with any of the embodiments previously described. Upon contact with the $CO_2$-based fluid 130 the $CO_2$-philic coating 120 of the coated proppant particle 142 may swell to a swollen $CO_2$-philic coating 121, producing a swollen self-suspending proppant 140. The swollen self-suspending proppants 140 may suspend within the hydraulic fracturing fluid 150 without any need for, or with a reduced need for, additives such as viscosifiers. However, the hydraulic fracturing fluid 150 in some embodiments may contain any additives commonly used in the art of fracking, including viscosifiers, for example. The hydraulic fracturing fluid 150 may contain biocides, breakers, buffers, stabilizers, diverting agents, fluid loss additives, friction reducers, iron controllers, surfactants, gel stabilizers, and viscosifiers. In some embodiments, the hydraulic fracturing fluid 150 may not contain any additional viscosifiers. In some embodiments, the hydraulic fracturing fluid 150 may include less than or equal to 30 wt. %, or 20 wt. %, or 15 wt. % or 10 wt. % of any additional viscosifiers. In an embodiment, fracturing fluid having $CO_2$ and hydrocarbons may contain viscosifiers for hydrocarbons such as alkyl phosphonates, in combination with iron (3+) or aluminum (3+) crosslinkers.

Figure 3:
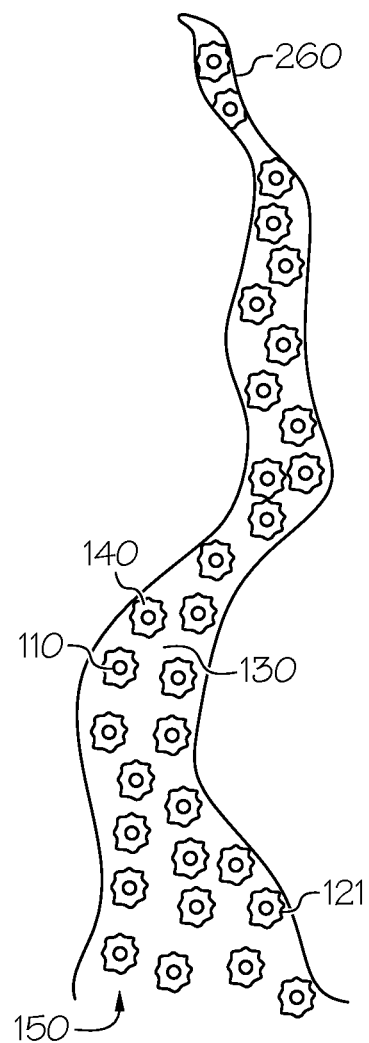
FIG. 3 is a schematic view of a subterranean fracture being contacted with a hydraulic fracturing fluid according to embodiments shown and described.

FIG. 3 is a schematic diagram of a subterranean formation being treated using hydraulic fracturing fluid containing proppants to propagate a fracture. As previously discussed, suspended proppant particles 110 within a hydraulic fracturing fluid 150 may aid in treating subterranean fractures, to prop open and keep open the fracture. FIG. 3 shows a subterranean fracture 260 that has been injected with hydraulic fracturing fluid 150 in accordance with the present embodiments containing swollen self-suspending proppants 140, according to the embodiments previously shown and described.

The subterranean fracture 260 of FIG. 3 was generated by contacting a subterranean formation with hydraulic fracturing fluid 150 and using the hydraulic fracturing fluid 150 to propagate and further open the subterranean fracture 260. The hydraulic fracturing fluid 150 in the subterranean fracture 260 of FIG. 3 comprises swollen self-suspending proppants 140 suspended in a $CO_2$-based fluid 130. In some embodiments, the swollen self-suspending proppants 140, owing in part to their increased buoyancy, may be distributed throughout the $CO_2$-based fluid 130. The swollen self-suspending proppants 140, as discussed previously, may have a density or buoyancy that prevents the particles from aggregating or otherwise coalescing within the subterranean fracture 260, owing in part to the swollen $CO_2$-philic coating 121. The hydraulic fracturing fluid 150 may be pumped into the subterranean fracture 260 or may be otherwise contacted with the subterranean formation. In some embodiments the hydraulic fracturing fluid 150 may be pressurized.

Embodiments of methods of treating a subterranean formation may include contacting the subterranean formation with the hydraulic fracturing fluid 150 that includes swollen self-suspending proppants 140 and a $CO_2$-based fluid 130 in accordance with any of the embodiments previously discussed. Such methods of treating a subterranean formation may include propagating at least one subterranean fracture 260 in the subterranean formation to treat the subterranean formation. In some embodiments, the subterranean formation may be a rock or shale formation. In some embodiments, contacting of the subterranean formation may include drilling into the subterranean formation and subsequently injecting the hydraulic fracturing fluid 150 into at least one subterranean fracture 260 in the subterranean formation. In some embodiments, the hydraulic fracturing fluid 150 may be pressurized before being injected into the subterranean fracture 260 in the subterranean formation.

Though embodiments of the present disclosure have been discussed in the context of hydraulic fracturing processes, embodiments of the present disclosure may also be used in other industries. For example, in some embodiments, the swollen self-suspending proppants 140 and hydraulic fracturing fluid 150 of the present disclosure may be used to stimulate groundwater wells, to precondition or induce rock cave-ins for mining operations, to dispose of waste by injecting it deeply into rock, to measure stresses in the Earth's crust, to generate electricity in enhanced geothermal systems, or to increase injection rates for the geologic sequestration of $CO_2$.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A self-suspending proppant comprising proppant particles coated with a $CO_2$-philic coating, in which:
   the $CO_2$-philic coating is crosslinked;
   the $CO_2$-philic coating has a physical structure that constrains $CO_2$ molecules;
   when the self-suspending proppant is added to a $CO_2$-based fluid comprising at least 30 weight percent $CO_2$ the self-suspending proppant volumetrically expands from a non-swollen state to a swollen state; and
   when the self-suspending proppant is added to a water-based fluid, the $CO_2$-philic coating swells less than or equal to half an amount the $CO_2$-philic coating swells when the self-suspending proppant is added to the $CO_2$-based fluid.

2. The self-suspending proppant of claim 1, in which the self-suspending proppant in the swollen state constrains $CO_2$ molecules within the physical structure.

3. The self-suspending proppant of claim 2, in which the physical structure of the $CO_2$-philic coating volumetrically expands by at least 10% from the non-swollen state to the swollen state.

4. The self-suspending proppant of claim 1, in which the proppant particles have a rough surface with an arithmetic average roughness ($R_a$) of greater than or equal to 1 nanometer (nm).

5. The self-suspending proppant of claim 1, in which the $CO_2$-philic coating comprises a $CO_2$-philic material chosen from polysaccharide acetates, polyethylene glycols, partially fluorinated oxygen-containing polymers, oxygenated polymers, crosslinked oxygen-containing polystyrenes, polyvinyl acetates, and combinations of any of these.

6. The self-suspending proppant of claim 1, in which the $CO_2$-philic coating does not dissociate from the proppant particles when the self-suspending proppant is added to a water-based fluid.

7. The self-suspending proppant of claim 1, in which when the self-suspending proppant is added to a fluid comprising at least 75 weight percent water, the $CO_2$-philic coating does not dissociate from the proppant particles.

8. The self-suspending proppant of claim 1, in which when the self-suspending proppant is added to a water-based fluid, less than 10 wt. % of the $CO_2$-philic coating dissolves.

9. The self-suspending proppant of claim 1, in which the $CO_2$-philic coating fully coats the surface of the proppant particle.

10. The self-suspending proppant of claim 1, in which the $CO_2$-philic coating partially coats the surface of the proppant particle.

11. The self-suspending proppant of claim 1, in which the physical structure of the $CO_2$-philic coating comprises void spaces that may accommodate $CO_2$ molecules.

12. The self-suspending proppant of claim 1, in which:
   the physical structure of the $CO_2$-philic coating volumetrically expands at least 10% from the non-swollen state to the swollen state; and
   the swollen self-suspending proppant has an increased buoyancy as compared the buoyancy of the self-suspending particle in the non-swollen state, such that the self-suspending proppant may self-suspend in the $CO_2$-based fluid.

13. The self-suspending proppant of claim 1, in which when the self-suspending proppant is added to a $CO_2$-based fluid consisting of at least 45 weight percent carbon dioxide and at least one of nitrogen, dimethyl ether, or hydrocarbons, the self-suspending proppant volumetrically expands from the non-swollen state to the swollen state.

14. The self-suspending proppant of claim 1, in which when the self-suspending proppant is added to a $CO_2$-based fluid consisting of at least 90 weight percent carbon dioxide and at least one of nitrogen, dimethyl ether, or hydrocarbons, the self-suspending proppant volumetrically expands from the non-swollen state to the swollen state.

15. The self-suspending proppant of claim 1, in which when the self-suspending proppant is added to a $CO_2$-based fluid consisting of carbon dioxide, the self-suspending proppant volumetrically expands from the non-swollen state to the swollen state.

16. The self-suspending proppant of claim 1, in which when the self-suspending proppant is added to a $CO_2$-based fluid consisting of supercritical carbon dioxide and at least one of nitrogen, dimethyl ether, or hydrocarbons, the self-suspending proppant volumetrically expands from the non-swollen state to the swollen state.

17. A self-suspending proppant comprising proppant particles coated with a $CO_2$-philic coating, in which: the $CO_2$-philic coating is crosslinked; the $CO_2$-philic coating has a physical structure that constrains $CO_2$ molecules; when the self-suspending proppant is added to a $CO_2$-based fluid consisting of at least 30 weight percent carbon dioxide as either supercritical carbon dioxide or subcritical carbon dioxide and at least one of nitrogen, dimethyl ether, or hydrocarbons, the self-suspending proppant volumetrically expands from a non-swollen state to a swollen state; and when the self-suspending proppant is added to a water-based fluid comprising at least 75 weight percent water, the $CO_2$-philic coating swells less than or equal to half an amount the $CO_2$-philic coating swells when the self-suspending proppant is added to the $CO_2$-based fluid.

18. The self-suspending proppant of claim 17, in which when the self-suspending proppant is added to a liquid $CO_2$-based fluid consisting of at least 51 weight percent subcritical carbon dioxide and at least one of nitrogen, dimethyl ether, or hydrocarbons, the self-suspending proppant volumetrically expands from the non-swollen state to the swollen state.

19. The self-suspending proppant of claim 17, in which when the self-suspending proppant is added to a $CO_2$-based fluid consisting of at least 51 weight percent supercritical carbon dioxide and at least one of nitrogen, dimethyl ether, or hydrocarbons, the self-suspending proppant volumetrically expands from the non-swollen state to the swollen state.

20. The self-suspending proppant of claim 17, in which the proppant particles are particles of a material selected from the group consisting of oxides, silicates, sand, ceramic, resin, plastic, mineral, glass, graded sand, treated sand, resin-coated sand, other resin-coated particles, bauxite, sintered bauxite, glass particles, glass beads, and combinations of any of these.

\* \* \* \* \*